United States Patent [19]

Nakao et al.

[11] Patent Number: 4,832,361
[45] Date of Patent: May 23, 1989

[54] FOLDABLE BABY CARRIAGE

[75] Inventors: Shinroku Nakao, Kanagawa; Yoshiyuki Suzuki; Hitoshi Kato, both of Tokyo, all of Japan

[73] Assignee: Combi Co., Ltd., Tokyo, Japan

[21] Appl. No.: 88,324

[22] Filed: Aug. 24, 1987

[30] Foreign Application Priority Data

Aug. 22, 1986 [JP] Japan .............................. 61-127985[U]
Aug. 25, 1986 [JP] Japan .............................. 61-129022[U]
Aug. 25, 1986 [JP] Japan .............................. 61-129023[U]

[51] Int. Cl.⁴ ............................................... B62B 7/08
[52] U.S. Cl. ..................... 280/642; 74/491; 74/501.6; 280/47.39; 280/643; 280/647; 280/650; 280/658; 285/419; 285/921; 403/344
[58] Field of Search ............... 280/642, 643, 644, 647, 280/648, 650, 658, 47.39; 74/488, 489, 491, 501 A, 501.6; 403/339, 340, 344; 285/921, 373, 419

[56] References Cited

U.S. PATENT DOCUMENTS 4,191,397 3/1980 Kassai .................................. 280/650
4,216,974 8/1980 Kassai .................................. 280/650
4,260,181 4/1981 Curtin .................................. 285/419
4,660,850 4/1987 Nakao et al. ......................... 280/650

FOREIGN PATENT DOCUMENTS 265716 4/1965 Australia .............................. 280/650

Primary Examiner—Charles A. Marmor
Assistant Examiner—Eric Culbreth
Attorney, Agent, or Firm—Sughrue, Mion, Zinn, Macpeak & Seas

[57] ABSTRACT

A foldable baby carriage also having a handle bar shiftable from a forward to a reverse position. Within a lower portion on each side of the handle bar is located a slider casing containing two sliders. Each slider holds a bar projecting through the casing of the handle bar to engage either a locking mechanism for the handle bar or a locking mechanism for folding the carriage. The sliders are connected by cable threaded through the interior of the handle bars to two pivoting operation levers at the top of the handle bar. The top of the handle bar is composed of two hard resin parts joined together and supporting the operation levers.

8 Claims, 7 Drawing Sheets

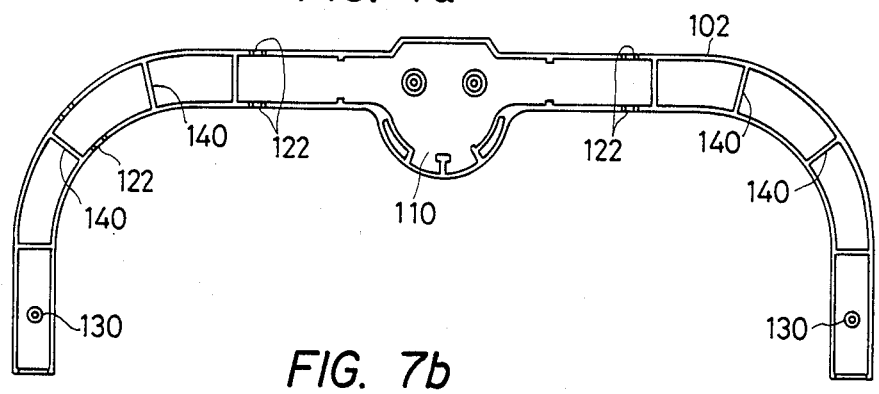
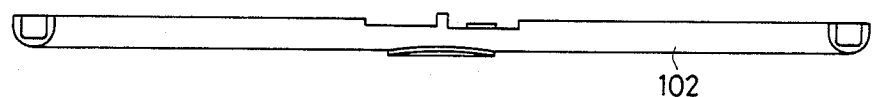
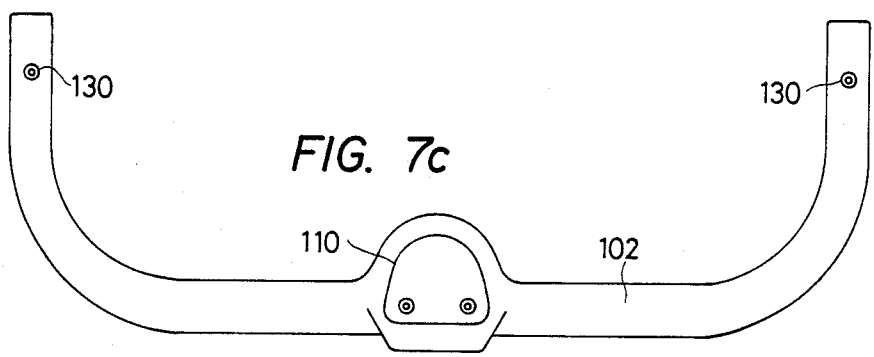
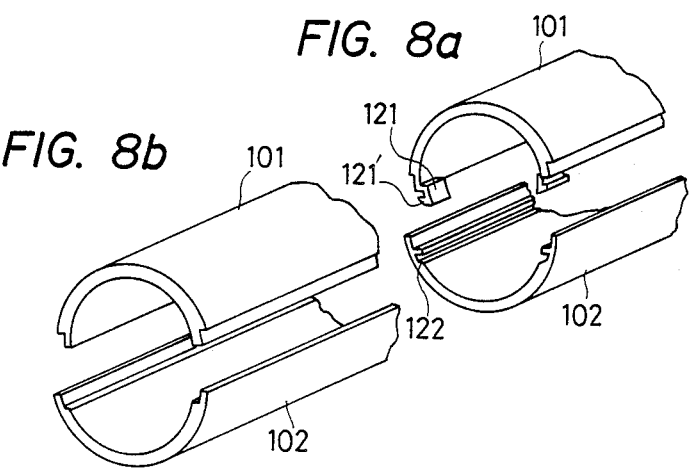

FOLDABLE BABY CARRIAGE

FIELD OF THE INVENTION

The present invention relates to a stroller or baby carriage for transporting or carrying a baby. It particularly relates to a foldable baby carriage having a handle bar improved in that two operation cable mechanisms for changing the erected position of the handle bar and for folding the body of the baby carriage are completely contained in the handle bar.

BACKGROUND OF THE INVENTION

Taking a baby or an infant out in the open air for a walk or for sun-bathing is necessary err the baby or infant to grow up healthy. It is, however, very uncomfortable on one hand for a guardian of the baby or infant to hold or carry the baby or infant in the arms or on the back for a long time. On the other hand, it is not desirable for the health of a growing baby or infant to be kept in a stiff posture for a long time.

To cope with those problems, baby carriages have been developed and a number of excellent improvements have so far been worked out in those baby carriage.

In the past, those baby carriages for carrying babies, as represented by box-type bassinets, were not foldable. Recently, those baby carriages have been developed into baby carriages generally available on the market. That is, the baby carriages have been improved to make it possible to change the attachment position of the handle bar to the side of the baby carriage at the back of the baby or at the front of the baby or have been so designed as to be foldable or portable according to necessity. The folding of the baby carriage body has a double advantage in that the baby carriage is suitable for being stored in little space when it is put away in the home, and that the baby carriage is portable to make it possible to carry the baby carriages into public traffic means such as a bus. Accordingly, the present day circumstances demand baby carriages having the above-described mechanisms.

It is desired that the operation of the folding mechanisms should be suitable for the those having little knowledge of mechanical operation. However, up to now, most of the operation mechanisms are so rough that the mechanisms, such as a handle bar stoppage releasing mechanism, an unfolding maintenance mechanism and the like, formed in the vicinity of the lower portion of the handle bar should be operated by direct touching with the hand.

Recently, such baby carriages as shown in Japanese Utility Model Unexamined Publication No. 48866/1986, Japanese Utility Model Application Nos. 153808/1984 and 93385/1985 filed by the same applicant as that of this application, have been developed. The proposed baby carriages are so constructed that operation wire cables for releasing a cable mechanism for changing the erection position of the handle bar and for releasing a lock mechanism for maintaining the unfolded state are contained in a handle bar. The wire cables are lead out from the lower end portions of the handle bar and connected at their ends to a separately provided operation mechanism. Through the development, the troublesome work of operating various kinds of releasing mechanisms with the hand has become eliminated.

However, even in those cases, the respective end portions of the wire cables are exposed outside in the vicinity of the base end portions of the handle bar, and various kinds of releasing mechanisms are connected to the exposed ends of the wire cables. Accordingly, when the swinging operation for changing the erection position of the handle bar or the folding operation for folding the baby carriages is repeatedly carried out, the exposed portions may be injured by abrasion caused by contact with other members. Ultimately, there is a risk of causing malfunctions. Further, the exposed end of each of the wire cables in directly connected to the releasing mechanism attached to the body of the baby carriages. Accordingly, when the baby carriage is manufactured, it is impossible that a body and a handle bar completely separately prepared are coupled or assembled by means of screws or any other means. After the two members are coupled, the cables or the like should be connected thereto.

Furthermore, an improvement other than the above-described improvements has been carried out as follows.

Various kinds of mechanisms are installed in the handle. For example, a mechanism for folding the body of the baby carriage (a mechanism for maintaining and releasing the unfolded state) is installed in the handle bar. Such an improvement produces the necessity of enclosing various kinds so mechanisms in the handle of the handle bar. Because it is necessary to select the size of the handle corresponding to the enclosing requirement, the conventional member prepared merely by bending a tubular metal bar so as to be U-shaped cannot be used for the purpose sufficiently.

SUMMARY OF THE INVENTION

To cope with those problems, it is an object of the present invention to provide a foldable baby carriage having a handle bar which is so constructed that sliding operation mechanisms disposed within end portions of the handle bar can be freely operated through operation wire cables by operation levers provided at a handle portion of the handle bar. It is desired the sliding operation mechanisms can be operated without being exposed outside the handle bar.

It is another object of the invention to provide a foldable baby carriage having a handle bar which is so constructed that each of the sliding operation mechanisms includes a plurality of operating means It is a further object of the invention to provide a foldable baby carriage having a folding operation mechanism which is so constructed that each of the sliding operation mechanisms includes an engagement/stopper bar arranged to engage with another operation mechanisms, such as a releasing mechanism or the like, attached to the body or the handle bar, whereby only the top end portion of the engagement/stopper bar is exposed and no mechanically coupling member is required between the two mechanisms.

It is a still further object of the invention to provide a foldable baby carriage having a handle bar including a handle portion which is made of a large-diameter tubular material and is firmly attached to the left and right parts of the handle bar to thereby from one body as a whole.

The present invention can be summarized as a foldable baby in which a pair of slider housing cases each housing a plurality of sliders are fitted into opposite end portions of a handle bar being formed in a U-shape in front view by bending a hollow pipe-like material. The sliders are arranged to slide up and down while being driven by the swinging of a pair of operation levers provided at a center handle portion of the handle bar through transmission wire cables inserted through the handle bar.

Further, according to the invention, each of the slider housing cases is arranged such that only engagement/stopper bars for folding the body of the baby carriage and for changing the erected position of the handle bar are projected outside from the sliders housed in the housing cases.

In addition, in the invention, the handle portion of the handle bar has a U-shape in plan view an is formed into a tubular body capable of being longitudinally divided into two, upper and lower parts. Each of the two parts constituting the handle portion is provided with engagement/stopper collars and engagement/stopper projections respectively formed at predetermined intervals on surface where the parts are superimposed one over the other so that the engagement/stopper collars and the engagement/stopper projections engage with each other to thereby form a tubular body as whole.

BRIEF DESCRIPTION OF THE DRAWINGS

The following drawings show an embodiment of the present invention.

FIGS. 5(a), 5(b), 5(c) and 5(d) show the relation between a slider and slider housing case, in which FIG. 5(a) is a front view, FIG. 5(b) is a side view, FIG. 5(c) is a vertical sectional view in the condition of FIG. 5(b), and FIG. 5(d) is a section a view taken along the line A—A of FIG. 5(a).

FIGS. 6(a), 6(b) and 6(c) show an upper frame in the handle portion of the handle bar, in which FIG. 6(a) is a plan view, FIG. 6(b) is a front view, and FIG. 6(c) is a bottom view.

FIGS. 7(a), 7(b) and 7(c) show a lower frame in the handle portion of the handle bar corresponding to the upper frame illustrated in FIGS. 6(a), 6(b) and 6(c), in which FIG. 7(a) is a plan view, FIG. 7(b) is a front view, and FIG. 7(c) is bottom view.

FIG. 8(a) and 8(b) are partly cutaway perspective views showing the constituent components of the handle portion of the handle bar, in which FIG. 8(a) shows a part taken along the line B—B of FIG. 6(c), and FIG. 8(b) shows a part taken along the line C—C of FIG. 6(c).

DETAILED DESCRIPTION OF TEE PREFERRED EMBODIMENT

Referring to the accompanying drawings, an embodiment of the invention will be described hereunder.

Figure 1:
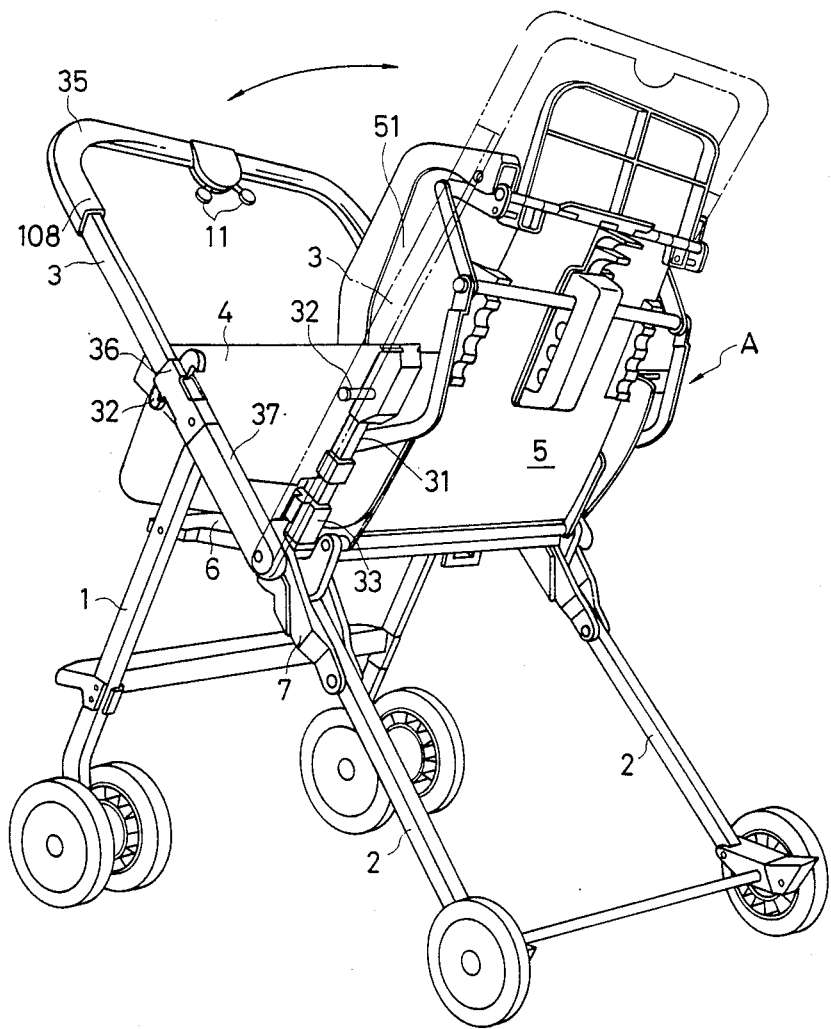
FIG. 1 is a perspective view of a baby carriage showing the condition that the handle bar is turned to the front of the seat (that is, the condition that the handle bar is placed in a position facing the baby).
Figure 2:
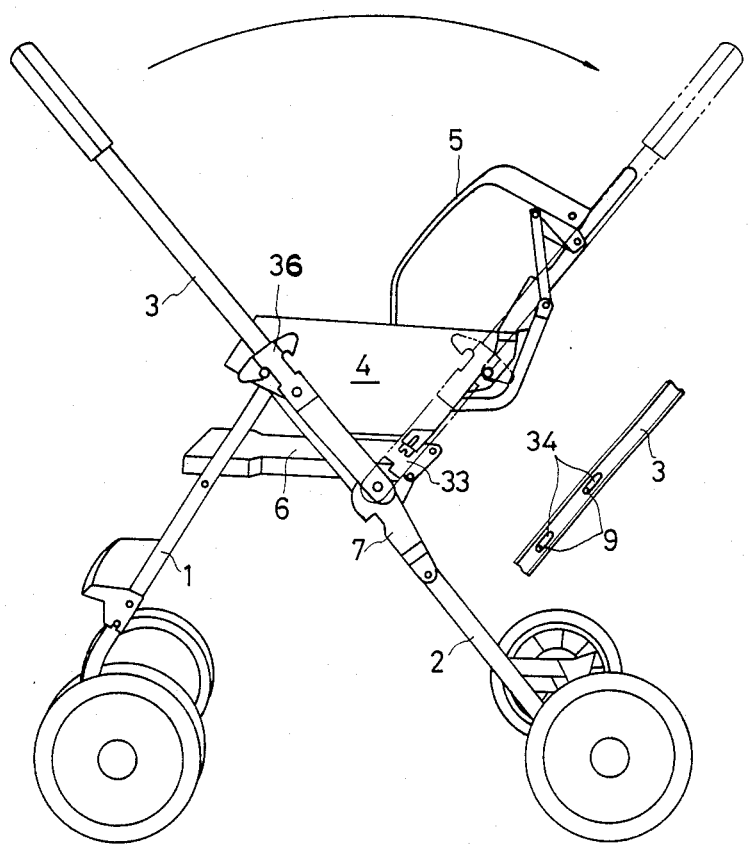
FIG. 2 is a side view thereof.

In a baby carriage generally designated by A in FIGS. 1 and 2, front leg bars 1, rear leg bars 2 and a handle bar 3 are foldably couple and assembled to constitute a body of the baby carriage. A pair of armrest bars 4 are respectively interposed between, on one side, a pivot portion where the upper ends of a front leg bar 1 and a rear leg bar 2 are combined at one place and, on the other side, a bearing bar 31 vertically erected from the longitudinally middle portion of the rear leg bar 2.

A backrest 5 is pivotally attached to the rear end of a seat 6 so that the inclination angle can be adjusted. A pair of side boards 51 are respectively formed on both sides of the backrest 5 so as to project upwards by a little distance to thereby guard the body of the baby.

Engagement/stopper hook plates 36 are attached to the handle bar 3 so as to be movable up and down and are spring biased downwardly. The engagement/stopper hook plates 36 are selectively engaged with engagement/stopper projections 32 respectively formed on the front end sides of the armrest bars 4 and on the upper end sides of the bearing bars 31. As a result, the handle bar 3 can be erected and locked on the side facing the baby as shown by solid lines in FIGS. 1 and or can be placed on the side of the backrest 5 as shown by broken lines.

The constituent members constituting a body of the baby carriage are pivotally attached to one another to thereby make it possible to compactly fold the baby carriage. The folding operation can be started by disengaging erection maintaining stoppers 33 attached to a part of the bearing bars 31 from stoppage maintaining plates 7 attached to the lower ends of the bearing bars 31. When the lower ends of the erection maintaining stoppers 33, which are spring biased downward are engaged with rotation stopping surfaces at the upper ends of the stoppage maintaining plates 7, the bearing bars 31 and the stoppage maintaining plates 7 are respectively maintained in an L-shaped state in side view. This engagement results in that the two pairs of parts cannot be folded to thereby make it impossible to collapse the baby carriage. However, when the two pairs of parts are disengaged from each other, the L-shaped state is released to thereby make it possible to fold the parts. This release results in that lowering of the rear ends of the armrest bars 4, approaching of the front leg bars 1 relative to the rear leg bars 2, piling of the backrest 5 on the seat 6, and the like, can be carried out to thereby make possible the whole folding operation possible. A second set of rotation stopping surfaces in the stoppage maintaining plates 7 are used together with the stoppers 33 to lock the baby carriage in the folded state. Although these folding operation mechanisms are commonly known, the mechanisms may be replaced by other known mechanisms. Detailed description of the mechanisms will be omitted, because the selection of such mechanisms is not important to the construction of the present invention.

Figures 3A, 3B:
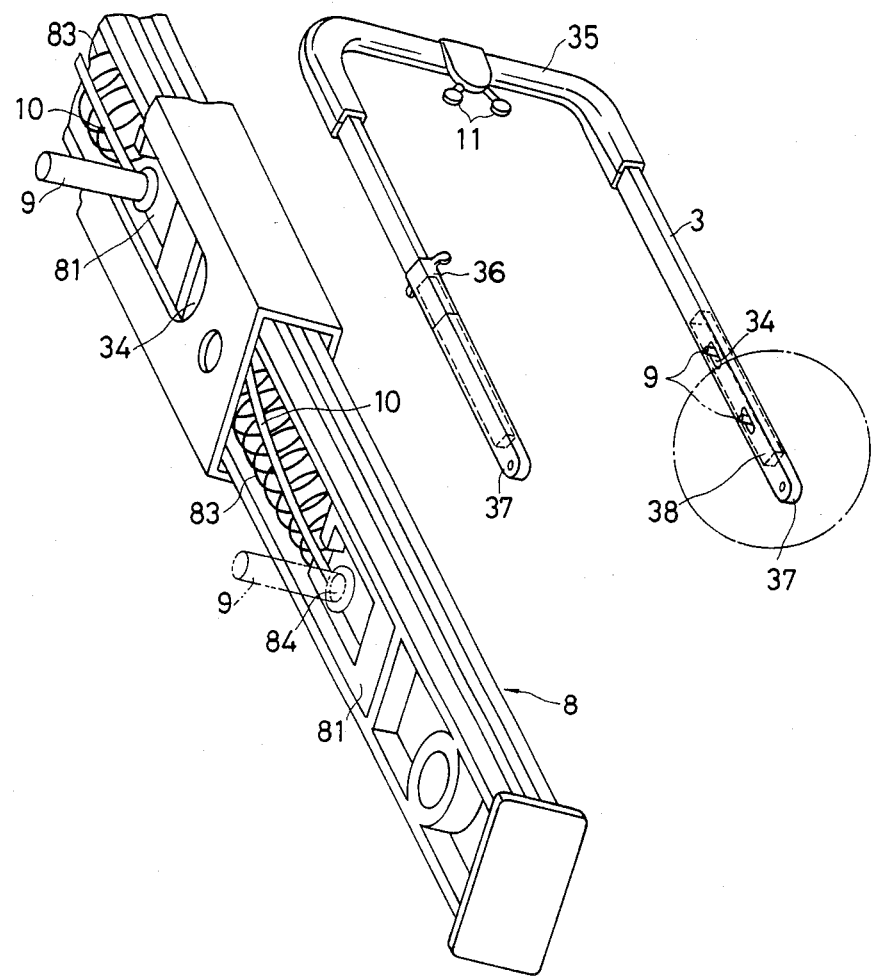
FIG. 3(a) is a perspective view showing the handle bar.
FIG. 3(b) is a partly cutaway enlarged perspective view showing the part surrounded by the broken line of FIG. 3.

As shown in FIGS. 5(a) to 5(d) and in perspective in FIG. 3(b), two cases 8 each house two sliders 81. Each of the cases 8 has a rod-like body made of relatively hard synthetic resin or the like so as to be substantially U-shaped in sectional view. Two slide grooves 82 respectively for the two sliders 81 are formed by substantially longitudinally dividing the U-shaped cave portion of the case 8. Springs 83 are disposed in the respective slide grooves 82 such that each spring 83 is elastically interposed between one end of the slider 81 and the upper wall of each of the slider grooves 82 so that the slider 82 is pressed against the other lower wall of the each of the two slide grooves 82 by the elastic force of the spring 83. That is, the sliders 81 are biased downward. Each of the respective sliders 81 is provided with a hole 84 for insertion/engagement of an operation bar 9, so that the bar 9 of a necessary length can be fixed in the hole 84.

As shown in FIGS. 3(a) and 3(b), a part (top end portion) of the bar 9 projects outside from the housing case 8 through a slot provided in a frame ba constituting the handle bar 3. The bar 9 is the only projecting member.

Figure 4:
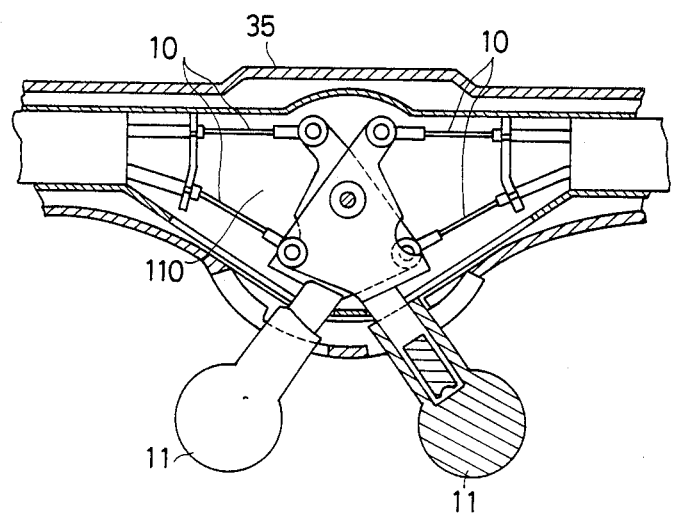
FIG. 4 is an enlarged transverse sectional view showing an example of attachment of the operation lever to the handle bar.

Wire cables 10 transmit force to the sliders 81 to slide them. Each of the wire cables 10 has one end connected to a corresponding one of the sliders 81 and the other end connected, as shown in FIG. 4, to the corresponding one of two operation levers 11 pivotally attached to a handle portion 35 of the handle bar 3.

The operation levers 11 attached to the handle portion 35 are so constructed that two wire cables 10 are connected to each of the lever bodies. The two wire cables 10 connected to each lever body branch off to the left and right, and are respectively connected to the left and right sliders 81 of the same function corresponding to each other. These mechanisms are known in the above-described older patent application by the applicant of this application. Further detailed description of those mechanisms will therefore be omitted.

Figure 5A:
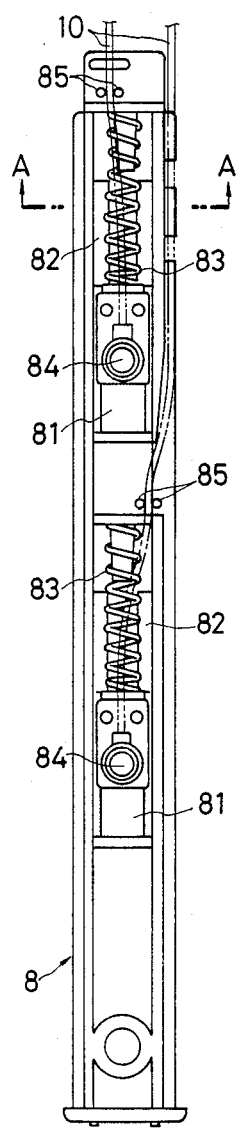
Figure 5B:
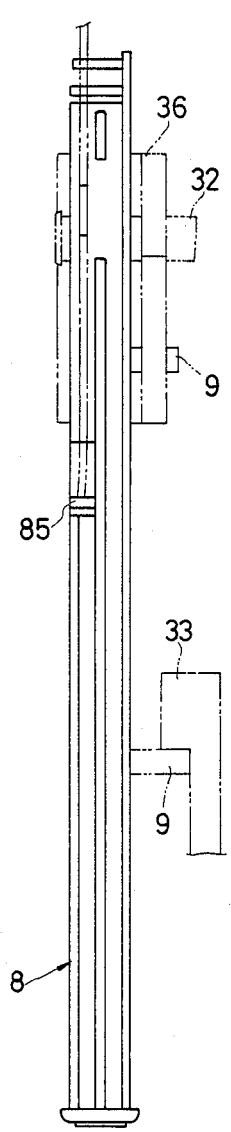
Figure 5C:
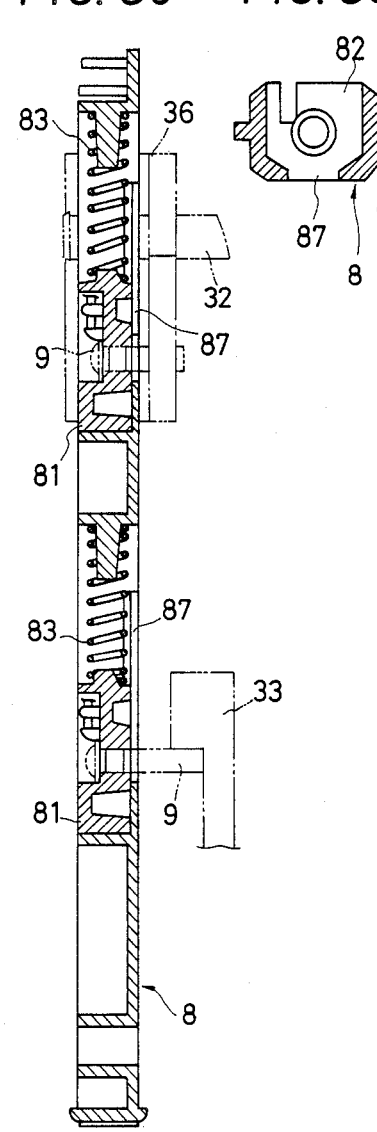
Figure 5D:
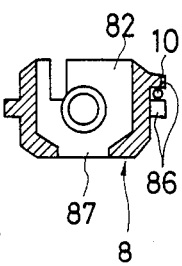
Figure 6A:
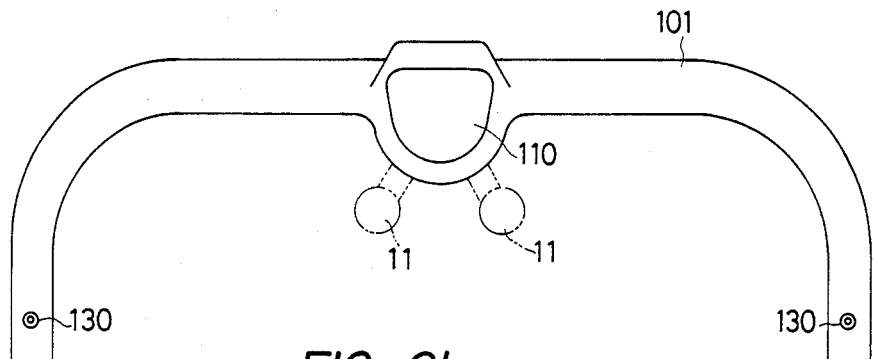
Figure 6B:
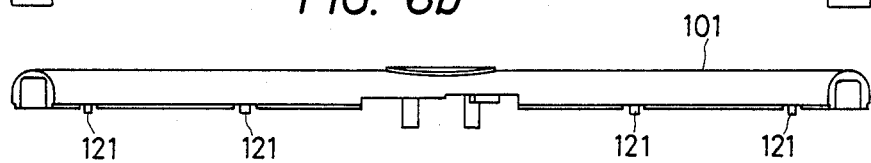
Figure 6C:
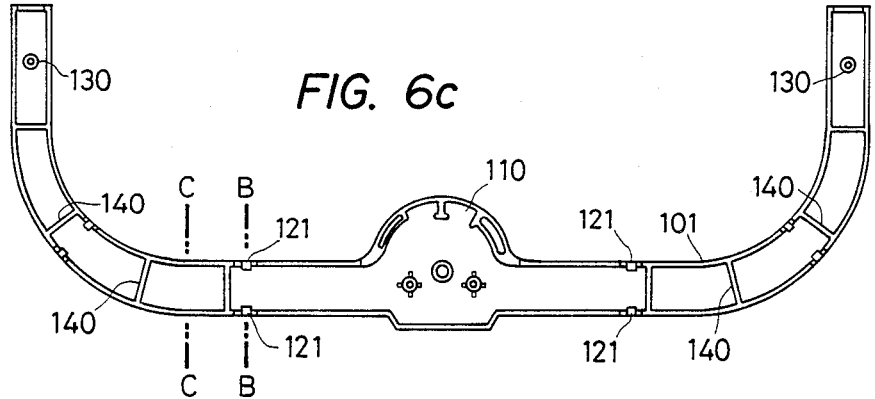

Two pairs of clip projections 85, shown in FIGS. 5(a) and 5(b) are provided on each slider housing case 8 with separation of a predetermined distance so as to hold a part of each of the wire cables 10 therebetween to prevent it from dropping out of the housing case 8 and so as to function as a guide for arranging the two wire cables 10 so as not to be tangled. A wire cable holder 86 is provided on the longitudinal side of the slider housing case 8. By means of the holder 86, the wire cable 10 connected to the slider 81 placed on the top end portion of the handle bar 3 can be prevented from being entangled with the other wire cable 10 connected to the other slider 81 placed on this side so as to ensure the smooth sliding of the wire cables 10.

Slots 87 are formed in the bottom surface of the slider housing case 8 in order to guide the sliding of the operation bars 9 inserted into and engaged with the respective sliders 81.

As shown in FIG. 3(a), the slider housing case 8 is inserted into the handle bar 3 from each end portion of the handle bar 3 and fixed to the inner side of the end portion of the handle bar 3 by a screw at a location 38. Slots 34 for sliding the bars 9 are provided in the side of the handle bar 3 corresponding to the slots 87 provided in the slider housing case 88, respectively.

Covers 37 are attached to both the lower ends of the handle bar 3 to beautify the lower ends of the handle bar 3 and to keep the outside appearance good.

By attaching the above-described sliding operation mechanisms into the handle bar 3, there arises the necessity that various kinds of mechanisms should be installed in the handle portion 35 of the handle bar 3, and the size of the handle portion 35 should be selected correspondingly. However, such a conventional member that is formed merely by bending a tubular metal bar into a single U-shape cannot be used for this purpose.

In the following, the specific construction of the handle portion 35 of the handle bar 3 according to the present invention is described with reference to FIGS. 6(a) through 8(b).

The handle bar 3 has an upper portion substantially U-shaped in plan view so that the user of the baby carriage can move the baby carriage while grasping the U-shaped portion. The handle portion 35 of the handle bar is attached to the U-shaped portion to be grasped.

The handle portion 35 is formed by bending a tubular body of hard synthetic resin or the like so as to be substantially U-shaped in plan view. The handle portion 35 made of the tubular body is so constructed that it can be lengthwise divided into two, upper and lower parts. The upper half of the handle portion 35 is constituted by an upper frame 101 (FIGS. 6(a) to 6(c)) shaped like a semicircle in sectional view and opened downwards, while the lower half opposite to the upper half is constituted by a lower frame 102 (FIGS. 7(a) to 7(c)) shaped like a semicircle in sectional view and opened upwards.

An operational member attachment portion 110 is so constructed that a space can b produced between the upper and lower frames 101 and 102 by setting their matching surfaces together. The two operation levers 11 connected to the wire cables 10 are pivotally installed in the attachment portion 110.

Slightly elastic engagement/stopper projections 121 are disposed at predetermined intervals on the opening edges (overlapping edges) of the upper frame 101. Each of portion, an engagement/stopper hook 121' (FIG. 8(a)). Engagement/stopper collars 122 are disposed at a predetermined distance on the opening edges of the lower frame 102. The engagement/stopper collars 122 are placed corresponding to the position of the engagement/stopper projections 121 formed on the upper frame 101, so that the engagement/stopper collars 122 are respectively engaged with the engagement/stopper hooks 121' of the engagement/stopper projections 121. The engagement/stopper hooks 121' and the engagement/stopper collars 122 have the effect of immediate locking when the upper and lower frames 101 and 102 are joined (overlapped) with each other.

Respective set-screw holes 130 are disposed in the vicinity of the respective opposite ends of the upper and lower frames 101 and 102. The handle bar 3, apart from the handle portion 35, is composed of two side frames of a straight or bent metallic tubular material of rectangular section. After the handle bar 3 is put between the upper and lower frames 101 and 102, the frames 101 and 102 are tightly integrated with side frames of the handle bar 3 by turning set-screws inserted in the set-screw holes 130.

Reinforcement ribs 140 are respectively disposed at predetermined intervals on the insides of the upper and lower frames 101 and 102. The reinforcement ribs 140 are so formed as not to interfere with the sliding of the wire cables 10 laid into he handle portion 35.

The invention constructed as described above operates as follows.

(1) In the case where the erection position of the handle bar 3 is to be changed to the front position or rear position.

In the case where the erection position of the handle bar 3 placed as shown by the solid line of FIG. 2 is to be changed to the rear of the seat 6 as shown by the broken line of FIG. 2, or in the case where the reverse operation is to be carried out, one lever 11 for changing the erection position of the handle bar 3 is selected from the two operation levers 11 and 11 pivotally provided in the handle portion of the handle bar 3 and is turned. The turning of the selected operation lever 11 produces the swinging of the wire cables each of which has one end connected to the operation lever 11. As the result, the upper sliders 81 respectively connected to the other end portions of the wire cables 10 are slid within the respective slider housing cases 8. It is a matter of course that the above-described parts or members are automatically cooperate together. It is noted that both the operation levers 11 can be biased radially of their pivots in a locked position so as to prevent their inadvertent operation.

With the sliding of the sliders 81, the bars 9 fixed into the holes 84 of the sliders 81 are slid upwards within the slots 87 and 34. As a result, the engagement/stopper hook plates 66 coaxially attached to the bars 9 so as to be movable upwards by the sliding of the bars 9 are moved upwards, so that the engagement/stoppage of the engagement/stopper hook plates 36 on the engagement/stopper projections 32 can be released.

In this condition, the handle bar 3 can be turned either frontwards or rearwards, so that the purpose of changing the erection position can be attached easily.

If the operation of the operation lever 11 is interrupted, the sliders 81 are respectively automatically returned to their original positions by the elastic force of the springs 83. Accordingly, there is no necessity of carrying out any special operation to maintain the stop condition.

(2) In the case where the body of the baby carriage is to be folded.

In this case, the erection position of the handle bar 3 placed as shown by the solid line in each of FIGS. 1 and 2 is changed to the position as shown by the broken line and is then fixed.

In this condition, the other lever 11 for releasing the folding state of the baby carriage is selected from the two operation levers 11 pivotally provided in the handle portion 35 and is then turned. The turning of the selected operation lever 11 produces the swinging of the two wire cables 10 each of which has one end connected to the operation lever 11 for folding. As the result, the lower sliders 81 respectively connected to the other end portions of the wire cables 10 are slid within the slider housing cases 8. It is a matter of course that the above-described parts or members automatically cooperate.

With the sliding of the lower sliders 81, the respective bars 9 fixed in the holes 81 of the sliders 84 are slid upwards within the slots 87 and 34. As a result, the stoppers 33 being movable upwards by engaging with the bars 9 are moved upwards, so that the engagement/stoppage of the stoppers 33 on the stoppage maintaining plates 7 can be released. In this condition, if the bearing bars 31 are operated for folding by selective and directive application of force to the baby carriage, all the members constituting the body of the baby carriage are folded so that the purpose can be easily attained.

If the operation of the operation lever 11 is interrupted, the sliders 81 are respectively automatically returned to their original positions by the elastic force of the springs 83. Accordingly, there is no necessity of carrying out any special operation to maintain the locked condition.

(3) In the case where the baby carriage in the folded state is to be unfolded.

If the members constituting the body of the baby carriage in the folded state as described above in the paragraph (2) are unfolded with the same operation of the operation lever 11, the stoppers 33 thereafter are automatically engaged with the stoppage maintaining plates 7 in response to the unfolding operation to thereby maintain the unfolded state easily.

According to the present invention constructed as described above, the slider housing cases 8 each containing two sliders 81 are completely disposed within the pipe body constituting the handle bar 3. Accordingly, it is possible to obtain a very simplified structure such that the members exposed outside are only the top end portions of the respective bars 9 fixed in the holes 84 of the respective sliders 81. Because of the existence of no exposed members, the present invention has the effect that the baby carriage can be used safely over a long term without occurrence of accidents, such as abrasion, breakage and the like caused by contact between exposed mechanisms when the folding or unfolding operation is carried out.

When the sliding operation is carried out, each bar 9 is merely brought into contact with the stopper 33 for releasing the unfolded state of the body of the baby carriage or with the engagement/stopper hook plate 36 for maintaining the erected position of the handle bar 3. The bar 9 is not continuously connected thereto. Accordingly, when the baby carriage is assembled, the body and the handle bar 3 can be completely separately produced Further, the assembling can be finished by simply pivotally attaching the handle bar to the body of the baby carriage. In short, the present invention has a very meritorious effect that it is possible to completely omit such a troublesome operation that is conventionally required for continuously connecting the wire cables of the slide mechanism to portions of the unfolding mechanism after the assembling work.

Of course, the simplicity of the construction as described above contributes to the reduction of cost. Further, because all the constituent members are housed in the tubular side frames of the handle bar, many excellent effects exist in that good outside appearance can be obtained. The slide members are not stained with mud or the like during the use of the baby carriage and the like.

Furthermore, according to the present invention, the handle bar 3 is formed by bending a sufficiently strong material, for example, a relatively small-diameter round or square tubular metal bar. If the material is used for the handle member of the baby carriage as it is, not only it is appreciated that handling property may be very poor because of the small diameter of the material, but also various kinds of parts such as operation levers and the like cannot be attached to such a small-diameter bar. However, according to the present invention, a large-diameter tubular handle portion 35 is firmly integrally attached onto the grasped portion at the upper ends of the two side frames as part of the handle bar, so that the problems in poor handling property and difficulty of attaching parts, such as levers and the like, can be completely solved.

Further, the external diameter of the handle cover can be freely selected regardless of its strength. Accordingly, the size can be so actively determined that the user feels untired in spite of grasping the handle for a long time. In addition, advantages exist in increase of handling property owing to the selection of the quality of material, excellence of design, and so on.

Further, the handle portion is formed of a tubular material divided into two, upper and lower parts, and by fitting the opening surfaces of the upper and lower parts to each other. Accordingly, not only the two parts can be easily integrated with each other by overlapping each other, but also the tubular material thus integrated is hardly separated. Thus, the baby carriage is simple in structural and low in cost.

What is claimed is:

1. A foldable baby carriage comprising:

a seat structure including attached foldable legs with wheels on lower ends thereof;

a handle bar attached to and pivoting on said seat structure and at least partially comprising a hollow pipe-like material;

a pair of slider housing cases fitted into opposite ends of said handle bar;

two sliders slidably fitted into each of said slider cases;

two operation levers pivotally attached at an upper portion of said handle bar;

different cable respectively connected within said handle bar between said two operation levers and said two sliders in each of said slider housing cases;

means for locking a posture of said handle bar pivoting on said seat structure and operatively connectable to a first one of said sliders in each of said two housing cases; and means for locking a folding posture of said seat structure and operatively connectable to a second one of said sliders in each of said two housing cases;

wherein each of said sliders comprises at least one engagement/stopper bar projecting to an outside of said slider housing cases and engaging at least one part slidable on an outside of said handle bar, said part thereby being movable by said at least one engagement/stopper bar.

2. A foldable baby carriage comprising:

a seat structure including attached foldable legs with wheels on lower ends thereof;

a handle bar attached to an pivoting on said seat structure and at least partially comprising a hollow pipe-like material;

a pair of slider housing cases fitted into opposite ends of said handle bar;

two sliders slidably fitted into each of said slider cases;

two operation levers pivotally attached at an upper portion of said handle bar;

different cables respectively connected within said handle bar between said two operation levers and said two sliders in each of said slider housing cases;

means for locking a posture of said handle bar pivoting on said seat structure and operatively connectable to a first one of said sliders in each of said two housing cases; and means for locking a folding posture of said seat structure and operatively connectable to a second one of said sliders in each of said two housing cases;

wherein each of said sliders comprises at least one engagement/stopper bar projecting to an outside of said slider housing cases;

wherein said engagement/stopper bars project through apertures to an outside of said handle bar, said sliders and slider housing cases otherwise not projecting outside of said handle bar.

3. A foldable baby carriage comprising:

a seat structure including attached foldable legs with wheels on lower ends thereof;

a handle bar attached to and pivoting on said seat structure and at least partially comprising a hollow pipe-like material;

a pair of slider housing cases fitted into opposite ends of said handle bar;

two sliders slidably fitted into each of said slider cases;

two operation levers pivotally attached at an upper portion of said handle bar;

different cables respectively connected within said handle bar between said two operation levers and said two sliders in each of said slider housing cases;

means for locking a posture of said handle bar pivoting on said seat structure and operatively connectable to a first one of said sliders in each of said two housing cases; and means for locking a folding posture of said seat structure and operatively connectable to a second one of said sliders in each of said two housing cases;

wherein each of said sliders comprises at least one engagement/stopper bar projecting to an outside of said slider housing cases;

wherein said folding posture locking means comprises a stopper movable on said handle bar which in a first position on said handle bar locks said posture in a folded state and in an unfolded state of said baby carriage and wherein one of said engagement/stopper bars of said sliders is engageable with said stopper.

4. A foldable baby carriage comprising:

a seat structure including attached foldable legs with wheels on lower ends thereof;

a handle bar attached to and pivoting on said seat structure and at least partially comprising a hollow pipe-like material;

a pair of slider housing cases fitted into opposite ends of said handle bar;

two sliders slidably fitted into each of said slider cases;

two operation levers pivotally attached at an upper portion of said handle bar;

different cables respectively connected within said handle bar between said two operation levers and said two sliders in each of said slider housing cases;

means for locking a posture of said handle bar pivoting on said seat structure and operatively connectable to a first one of said sliders in each of said two housing cases; and means for locking a folding posture of said seat structure and operatively connectable to a second one of said sliders in each of said two housing cases;

wherein each of said sliders comprises at least one engagement/stopper bar projecting to an outside of said slider housing cases;

wherein each of said sliders has a hole fitted with one of said engagement/stopper bars;

wherein said folding posture locking means is engageable with one of said engagement/stopper bars; and wherein said handle bar posture locking means comprises a hook locking said posture of said handle bar and engageable with one of said engagement/stopper bars, and wherein only a free end portion of each of said engagement/stopper bars projects to an outside of said handle bar.

5. A foldable baby carriage comprising:

a seat structure including attached foldable legs with wheels on lower ends thereof;

a handle bar attached to and pivoting on said seat structure and at least partially comprising a hollow pipe-like material;

a pair of slider housing cases fitted into opposite ends of said handle bar;

two sliders slidably fitted into each of said slider cases;

two operation levers pivotally attached at an upper portion of said handle bar;

different cables respectively connected within said handle bar between said two operation levers and said two sliders in each of said slider housing cases;

wherein each of said sliders comprises at least one engagement/stopper bar projecting to an outside of said slider housing cases, and engaging at least one first part slidable on an outside of said handle bar, said first part thereby being movable by said at least one engagement stopper bar; and wherein said upper portion of said handle bar comprises an upper part and a lower part, each U-shape in plan view, semi-tubular in cross section at least at ends thereof and engageable with each other.

6. A foldable baby carriage as recited in claim 5, wherein said upper and lower parts of said handle bars are provided with collars and projections engageable with said collars at intervals along said parts for engaging together said two parts.

7. A foldable baby carriage as recited in claim 6, wherein said upper and lower parts of said handle bars are made of a hard synthetic resin.

8. A foldable baby carriage as recited in claim 7, wherein said upper and lower parts of said handle bars include at a center thereof a housing portion for housing said operation levers.

* * * * *